United States Patent
Wang et al.

(10) Patent No.: US 10,796,438 B2
(45) Date of Patent: Oct. 6, 2020

(54) METHOD AND APPARATUS FOR TRACKING TARGET PROFILE IN VIDEO

(71) Applicant: Baidu Online Network Technology (Beijing) Co., Ltd., Beijing (CN)

(72) Inventors: Jian Wang, Beijing (CN); Shilei Wen, Beijing (CN); Xiao Liu, Beijing (CN); Xubin Li, Beijing (CN); Errui Ding, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 106 days.

(21) Appl. No.: 16/134,671

(22) Filed: Sep. 18, 2018

(65) Prior Publication Data

US 2019/0197703 A1    Jun. 27, 2019

(30) Foreign Application Priority Data

Dec. 21, 2017 (CN) .......................... 2017 1 1397545

(51) Int. Cl.

| | |
|---|---|
| *G06T 7/00* | (2017.01) |
| *G06T 7/246* | (2017.01) |
| *G06T 7/73* | (2017.01) |
| *G06T 7/277* | (2017.01) |
| *G06K 9/62* | (2006.01) |
| *G06K 9/00* | (2006.01) |

(52) U.S. Cl.
CPC .......... *G06T 7/248* (2017.01); *G06K 9/00718* (2013.01); *G06K 9/6215* (2013.01); *G06T 7/246* (2017.01); *G06T 7/277* (2017.01); *G06T 7/74* (2017.01); *G06T 2207/10016* (2013.01); *G06T 2207/20021* (2013.01)

(58) Field of Classification Search
CPC .......... G06T 7/248; G06T 7/74; G06T 7/246; G06T 7/277; G06K 9/00718; G06K 9/6215

USPC ........................................................ 382/199
See application file for complete search history.

(56) References Cited

U.S. PATENT DOCUMENTS

| | | | |
|---|---|---|---|
| 2010/0315547 A1* | 12/2010 | Takada ................. | H04N 19/503 348/416.1 |
| 2012/0219184 A1* | 8/2012 | Maki ....................... | G06T 7/246 382/103 |
| 2018/0137651 A1* | 5/2018 | Levinshtein ....... | G02B 27/0172 |

OTHER PUBLICATIONS

Qin, Wan, "Research on Methods of Multiple Moving Objects Detecting and Tracking in Intelligent Visual Surveillance," dissertation, Hunan University, 2009, pp. 41, 45-60. (21 pages) (w/ English Abstract).

\* cited by examiner

*Primary Examiner* — Michael R Neff (74) *Attorney, Agent, or Firm* — Seed IP Law Group LLP (57) ABSTRACT

A method for tracking a target profile in a video includes: determining position information of corner points of the target profile and parameter information of a first edge formed by adjacent corner points in a previous image frame adjacent to a current image frame; tracking corner points of the target profile in the previous image frame to acquire position information of the corner points of the target profile in the current image frame to determine parameter information of a second edge; predicting to acquire predicted parameter information, and generating candidate target profiles based on the predicted parameter information, in response to determining that a similarity between the first edge and a second edge corresponding to the first edge being less than a first preset threshold; and determining a final position of the target profile in the current image frame based on the candidate target profiles.

13 Claims, 5 Drawing Sheets

METHOD AND APPARATUS FOR TRACKING TARGET PROFILE IN VIDEO

CROSS-REFERENCE TO RELATED APPLICATIONS

This application claims priority to Chinese Patent Application No. 201711397545.0, filed on Dec. 21, 2017, titled "Method and Apparatus for Tracking Target Profile in Video," which is hereby incorporated by reference in its entirety.

TECHNICAL FIELD

Embodiments of the present disclosure relate to the field of computer technology, specifically relate to the field of Internet technology, and more specifically relate to a method and apparatus for tracking a target profile in a video.

BACKGROUND

In video processing, if editions such as performing watermark addition, mosaic masking or color correction need to be performed on a video object, the exact location of the video object needs to be known.

The existing technology provides a variety of methods for tracking a video target profile of a to-be-edited object in a video, but the methods are generally only applicable to some scene conditions and are difficult to be applied to a variety of complex scenes. For example, the existing video tracking methods based on sparse optical flow/dense optical flow have difficulty in accurately determining the target profile when the target profile is blocked. The existing video tracking methods based on feature point matching is not applicable to the tracking of a target profile of weak texture. For a frame-by-frame image segmentation method, the segmentation algorithm cannot accurately recognize the boundary of the target profile in a complex scene. Therefore, how to accurately track the target profile in each image frame of a video in various complex scenes becomes an urgent problem to be solved.

SUMMARY

The objective of embodiments of the present disclosure includes providing a method and an apparatus for tracking a target profile in a video.

In a first aspect, the embodiments of the present disclosure provide a method for tracking a target profile in a video, including: determining position information of corner points of the target profile and parameter information of a first edge formed by adjacent corner points in a previous image frame adjacent to a current image frame of the target video, the first edge being an edge of the target profile in the previous image frame; tracking the corner points of the target profile in the previous image frame to acquire position information of the corner points of the target profile in the current image frame to determine parameter information of a second edge, the second edge being an edge formed by adjacent corner points of the target profile in the current image frame; predicting for parameter information of the first edge in the previous image frame to acquire predicted parameter information, and generating a plurality of candidate target profiles based on the predicted parameter information, in response to determining that a similarity between the first edge and a second edge corresponding to the first edge being less than a first preset threshold; and determining a final position of the target profile in the current image frame based on image features of the candidate target profile.

In some embodiments, the determining position information of corner points of the target profile and parameter information of a first edge formed by adjacent corner points in a previous image frame adjacent to a current image frame of the target video, includes: determining the position information of the corner points of the target profile in the previous image frame of the target video; and determining the parameter information of each first edge of the target profile in the previous image frame based on the determined position information of the corner points.

In some embodiments, the tracking corner points of the target profile in the previous image frame to acquire position information of the corner points of the target profile in the current image frame to determine parameter information of a second edge includes: tracking the corner points in the previous image frame by using a KLT tracking algorithm to acquire the position information of the corner points of the target profile in the current image frame; and determining the parameter information of each second edge of the target profile in the current image frame using the acquired position information of the corner points.

In some embodiments, after the tracking corner points of the target profile in the previous image frame to acquire position information of the corner points of the target profile in the current image frame to determine parameter information of a second edge, the method further includes: calculating a similarity between the first edge and the second edge by using the parameter information of the first edge and the parameter information of the second edge, for the first edge determined by any two adjacent corner points in the previous image frame and the second edge of the current image frame determined by position information acquired by tracking the two adjacent corner points; and determining, by using the position information of the corner points acquired by tracking, the final position of the target profile in the current image frame, in response to determining that the similarity between the first edge and the second edge being greater than or equal to the first preset threshold.

In some embodiments, the predicting for parameter information of first edges in the previous image frame to acquire predicted parameter information, and generating a plurality of candidate target profiles based on the acquired predicted parameter information, includes: predicting for the parameter information of the first edge in the previous image frame by using a Kalman filter to acquire the predicted parameter information; determining predicted edges by using the predicted parameter information, and determining a plurality of predicted corner points based on the predicted edges; determining centering on can predicted corner point a candidate corner point of the predicted corner point in the current image frame; and generating a plurality of candidate target profiles using the predicted corner points and the candidate corner points.

In some embodiments, the determining a final position of the target profile in the current image frame based on image features of the plurality of candidate target profiles, includes: dividing the target video into consecutive N frames of images, where N is a positive integer; generating a reference image frame by using image frames preceding the previous image frame, and extracting an image feature of the target profile from the reference image frame; calculating similarities between the image feature of the extracted target profile and image features of the candidate target profile; determining, from the candidate target profiles, a candidate target profile having the greatest similarity with the target profile in the reference image frame as the target profile in the current frame; and determining the final position of the target profile in the current frame using the determined position information of the corner points of the target profile in the current frame.

In a second aspect, the embodiments of the present disclosure provide an apparatus for tracking a target profile in a video, including: a first determination unit, configured to determine position information of corner points of the target profile and parameter information of a first edge formed by adjacent corner points in a previous image frame adjacent to a current image frame of the target video, the first edge being an edge of the target profile in the previous image frame; a tracking unit, configured to track the corner points of the target profile in the previous image frame to acquire position information of the corner points of the target profile in the current image frame to determine parameter information of a second edge, the second edge being an edge formed by adjacent corner points of the target profile in the current image frame; a prediction unit, configured to predict for parameter information of the first edge in the previous image frame to acquire predicted parameter information, and generate a plurality of candidate target profiles based on the predicted parameter information, in response to determining that a similarity between the first edge and a second edge corresponding to the first edge being less than a first preset threshold; and a second determination unit, configured to determine a final position of the target profile in the current image frame based on image features of the candidate target profile.

In some embodiments, the first determination unit is further configured to: determine the position information of the corner points of the target profile in the previous image frame of the target video; and determine the parameter information of each first edge of the target profile in the previous image frame based on the determined position information of the corner points.

In some embodiments, the tracking unit is further configured to: track the corner points in the previous image frame by using a KLT tracking algorithm to acquire the position information of the corner points of the target profile in the current image frame; and determine the parameter information of each second edge of the target profile in the current image frame using the acquired position information of the corner points.

In some embodiments, the apparatus further includes: a calculation unit, configured to calculate a similarity between the first edge and the second edge by using the parameter information of the first edge and the parameter information of the second edge, for the first edge determined by any two adjacent corner points in the previous image frame and the second edge of the current image frame determined by position information acquired by tracking the two adjacent corner points; and a third determination unit, configured to determine, by using the position information of the corner points acquired by tracking, the final position of the target profile in the current image frame, in response to determining that the similarity between the first edge and the second edge being greater than or equal to the first preset threshold.

In some embodiments, the prediction unit is further configured to: predict for the parameter information of the first edge in the previous image frame by using a Kalman filter to acquire the predicted parameter information; determine predicted edges by using the predicted parameter information, and determining a plurality of predicted corner points based on the predicted edges; determine, centering on each predicted corner point, a candidate corner point of the predicted corner point in the current image frame; and generate a plurality of the candidate target profiles using the predicted corner points and the candidate corner points.

In some embodiments, the second determination unit is further configured to: divide the target video into consecutive N frames of images, where N is a positive integer; generate a reference image frame by using image frames preceding the previous image frame, and extract an image feature of the target profile from the reference image frame; calculate similarities between the image feature of the extracted target profile and image features of the candidate target profile; determine, from the candidate target profiles, a candidate target profile having the greatest similarity with the target profile in the reference image frame as the target profile in the current frame; and determine the final position of the target profile in the current frame using the determined position information of the corner points of the target profile in the current frame.

The method and apparatus for tracking a target profile in a video according to the embodiments of the present disclosure may determine parameter information of a second edge of the target profile in a current image frame by tracking corner points in a previous image frame through the position information of corner points of the target profile and parameter information of a first edge in the previous image frame of the acquired target video, then predict for the first edge to acquire predicted parameter information, and generate a plurality of candidate target profiles based on the predicted parameter information, in response to determining that a similarity between the first edge and a second edge corresponding to the first edge being less than a first preset threshold, and finally determine a final position of the target profile in the current image frame based on image features of the candidate target profiles, thereby realizing the tracking of the target profile by combining features of the corner points and the edges of the target profile, predicting for and optimizing an inaccurate tracking result, and improving the accuracy of the target profile tracking.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
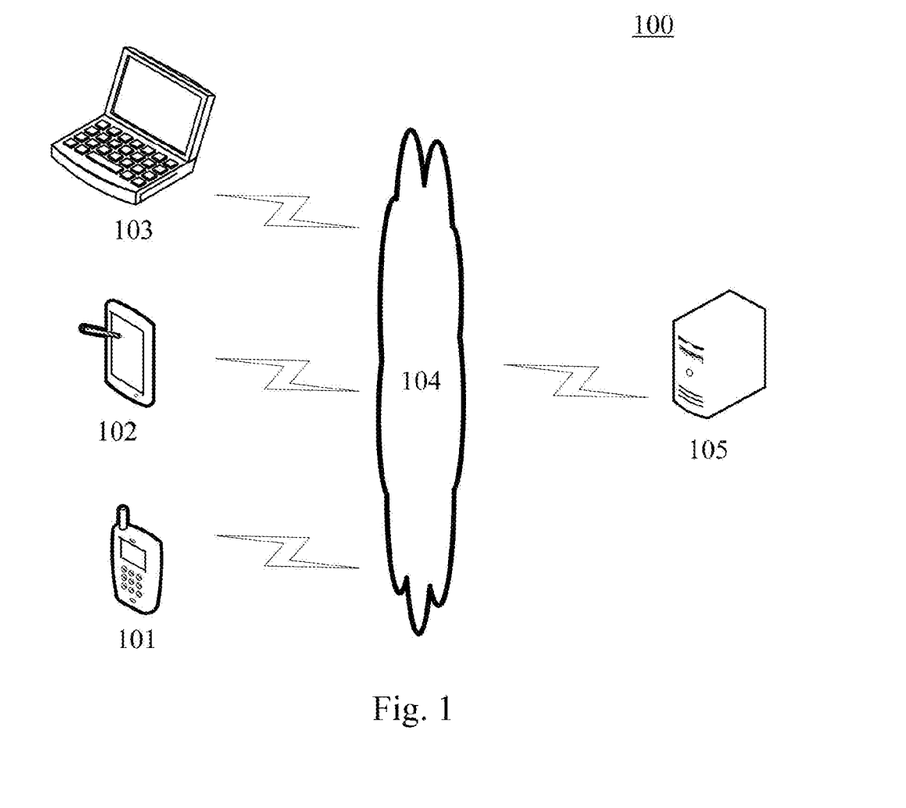
FIG. 1 is an architectural diagram of an exemplary system in which the present disclosure may be implemented.

FIG. 1 shows an exemplary architecture of a system 100 in which a method for tracking a target profile in a video or an apparatus for tracking a target profile in a video according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as video playing applications, picture viewing application, webpage browser applications, search applications, instant messaging tools, mailbox clients, and social platform software may be installed on the terminal devices 101, 102 and 103.

The terminal devices 101, 102 and 103 may be various electronic devices having display screens and supporting functions such as video playing, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend video server providing support to the video played on the terminal devices 101, 102 or 103. The backend video server may perform a processing such as a division, target profile tracking on a received video, and return a processing result (for example, the tracked target profile) to the terminal devices.

It should be noted that the method for tracking a target profile in a video according to the embodiments of the present disclosure is generally executed by the server 105. Accordingly, the apparatus for tracking a target profile in a video is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
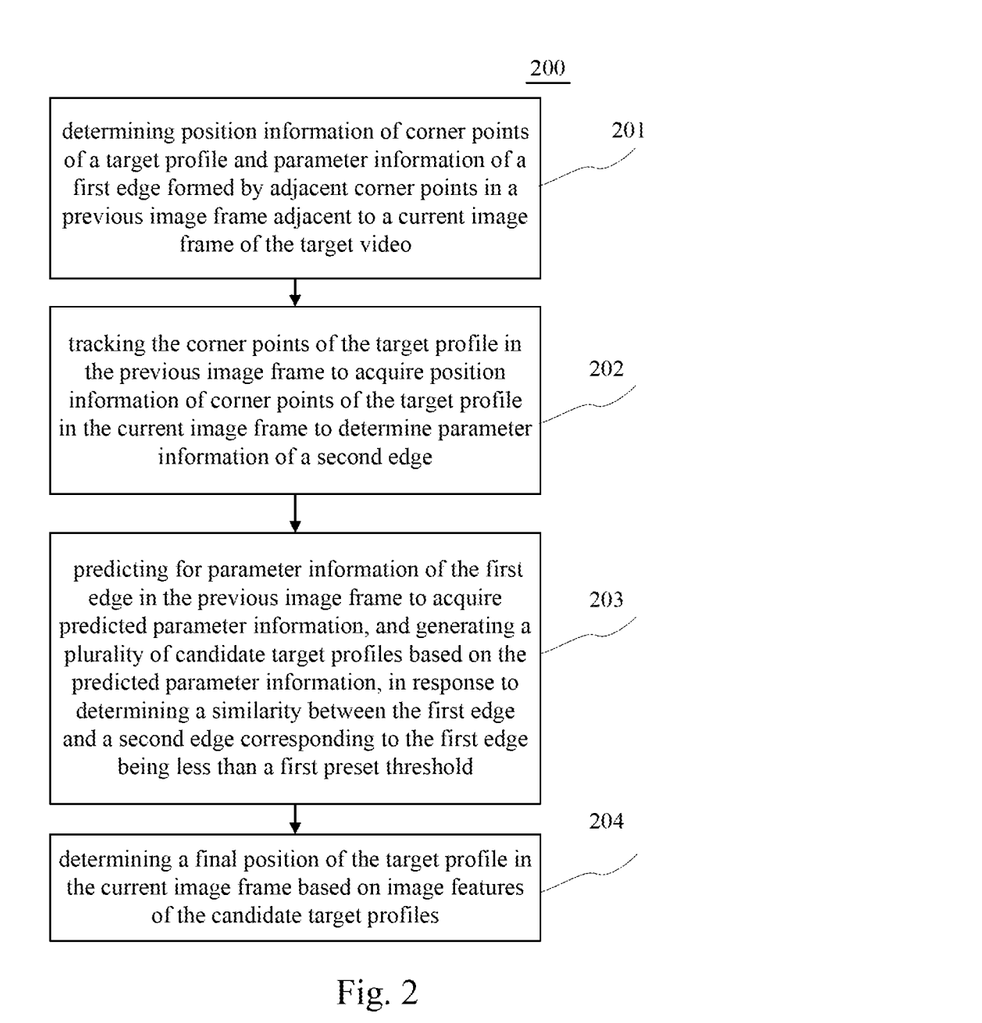
FIG. 2 is a flowchart of a method for tracking a target profile in a video according to an embodiment of the present disclosure.

With further reference to FIG. 2, a flow 200 of a method for tracking a target profile in a video according to an embodiment of the present disclosure is illustrated. The method for tracking a target profile in a video includes steps 201 to 204.

Step 201 includes determining position information of corner points of a target profile and parameter information of a first edge formed by adjacent corner points in a previous image frame adjacent to a current image frame of the target video.

In the present embodiment, the electronic device (e.g., the server as shown in FIG. 1) on which the method for tracking a target profile in a video is implemented may receive, through a wired connection or a wireless connection, the target video from a terminal used by the user for playing video, then extract multiple image frames from the acquired target video, determine the previous image frame adjacent to the current image frame from the image frames, and finally determine position information of the corner points of the target profile and parameter information of the first edge formed by adjacent corner points in the previous image frame. Here, the first edge may be an edge of the target profile in the previous image frame. The target profile here may be a polygon formed by an outline of an object (such as a television or a photo frame) in the video image frames.

It should be noted that the wireless connection may include, but is not limited to, 3G/4G connection, WiFi connection, Bluetooth connection, WiMAX connection, Zigbee connection, UWB (ultra wideband) connection, and other wireless connections known by now or to be developed in the future.

In some alternative implementations of the present embodiment, the electronic device may first determine position information of the corner points of the target profile in the previous image frame of the target video, and then calculate parameter information of each first edge of the target profile in the previous image frame according to the determined position information of the corner points.

In some alternative implementations of the present embodiment, in the target video, the previous image frame adjacent to the current image frame may be the first image frame in the target video. In this case, the corner point position of the target profile and the parameter information of the first edge in the first image frame may be marked by manual annotation, so that the corner point position of the target profile and the parameter information of the first edge in this image frame may be accurately obtained. Alternatively, in the target video, the previous image frame adjacent to the current image frame may be any image frame succeeding the first image frame. In this case, the corner point position information of the target profile and the parameter information of the first edge in the previous image frame may be determined by tracking an image frame preceding the previous image frame and adjacent to the previous image frame.

Step 202 includes tracking the corner points of the target profile in the previous image frame to acquire position information of corner points of the target profile in the current image frame to determine parameter information of a second edge.

In the present embodiment, based on the corner points of the target profile determined in the previous image frame in step 201, the electronic device (such as the server shown in FIG. 1) may track corner points of the target profile in the previous image frame, such that position information of corner points identical or similar to the corner points in the previous image frame may be determined in the current image frame adjacent to the previous image frame, and the determined position information of the corner points is tracked corner point position information. The position information of the tracked corner points may be used to determine parameter information of the second edge formed by adjacent corner points. Here, the second edge is an edge of the tracked target profile in the current image frame, and the second edge is formed by the tracked adjacent corner points.

In general, tracking the target profile in the video may be understood as finding areas having same or similar features on a continuous sequence of images so that the position of the target profile may be determined in the image. Here, the electronic device may determine the position of the target profile by tracking the position information of the corner points of the target profile and combining the parameter information of the edge of the target profile. Further, the electronic device may use a suitable tracking algorithm to track the corner points of the target profile. For example, the FAST (features from accelerated segment test) feature point extraction algorithm may be used to achieve the purpose of tracking the corner points of the target profile.

Step 203 includes predicting for parameter information of the first edge in the previous image frame to acquire predicted parameter information, and generating a plurality of candidate target profiles based on the predicted parameter information, in response to determining a similarity between the first edge and a second edge corresponding to the first edge being less than a first preset threshold.

In the present embodiment, for any two corner points in the previous image frame that may form the first edge, the second edge corresponding to the first edge may be determined by using the tracked two corner points. The electronic device may first calculate the similarity between the first edge and the second edge corresponding to the first edge. It may be understood that if the difference between the parameter information of the first edge and that of the second edge corresponding to the first edge is large, it may be determined that the target profile in the previous image frame has a large difference from the tracked target profile in the current image frame. In adjacent two image frames of the video, the target profile is generally the same or similar. It can be seen that when the similarity between the first edge and the second edge is small, it may be determined that there is a large deviation in the target profile in the tracked current image frame. Therefore, in the case that the electronic device determines that the similarity between the first edge and the second edge corresponding to the first edge is less than a preset threshold, the tracked target profile may be considered as inaccurate. The electronic device may predict for parameter information of the first edge in the previous image frame to acquire predicted parameter information. Then, the electronic device may generate a plurality of candidate target profiles by using the acquired predicted parameter information.

It can be seen that the method according to the embodiments of the present disclosure may combine the corner point feature of the target profile and the edge feature of the target profile to determine whether there is a large deviation in the tracked target profile, and when it is determined that the tracked target profile has the large deviation, the tracking result is further processed, thereby improving the accuracy of tracking the target profile in the video.

Step 204 includes determining a final position of the target profile in the current image frame based on image features of the candidate target profiles.

In the present embodiment, based on the plurality of candidate target profiles generated in step 203, the electronic device processes image features of the target profiles by various approaches, so that the final position of the target profile in the current image frame may be determined based on the image features of the candidate target profiles.

In some alternative implementations of the present embodiment, the electronic device may determine the candidate target profile having the greatest similarity with the target profile in the reference image frame as the target profile in the current image frame, by comparing each candidate target profile with the target profile in the reference image frame.

For example, the electronic device may divide the target video into consecutive N frames of images. Then, the current image frame, the previous image frame adjacent to the current image frame, and image frames preceding the previous image frame are determined. After that, calculation processing such as averaging is performed on the features of the image frames preceding the previous image frame to generate the reference image frame, and the reference image frame may include the target profile. Finally, the similarity between the candidate target profile and the target profile in the reference image frame is calculated by using the image features of the candidate target profiles and the image feature of the target profile in the reference image frame, to determine, from the candidate target profiles, the candidate target profile having the greatest similarity with the target profile in the reference image frame. The final position of the target profile in the current frame may be determined using the position information of the corner points of the determined candidate target profile, for example, using the corner point position of the determined candidate target profile as the position of the corner point of the target profile in the current image frame.

The method according to the embodiments of the present disclosure may determine the parameter information of the second edge of the target profile in the current image frame by tracking corner points in the previous image frame through obtaining the position information of the corner points of the target profile and parameter information of the first edge in the previous image frame of the acquired target video, then may predict for parameter information of the first edge to acquire predicted parameter information, and generate a plurality of candidate target profiles based on the predicted parameter information, in response to determining that a similarity between the first edge and the second edge corresponding to the first edge being less than a first preset threshold, and finally may determine the final position of the target profile in the current image frame based on image features of the candidate target profile, thereby realizing the tracking of the target profile by combining features of the corner points and the edges of the target profile, predicting and optimizing an inaccurate tracking result, and improving the accuracy of the target profile tracking. This method may solve the problem of tracking a target profile in complicated situations such as the target profile being blocked and the target profile having weak texture.

Figure 3:
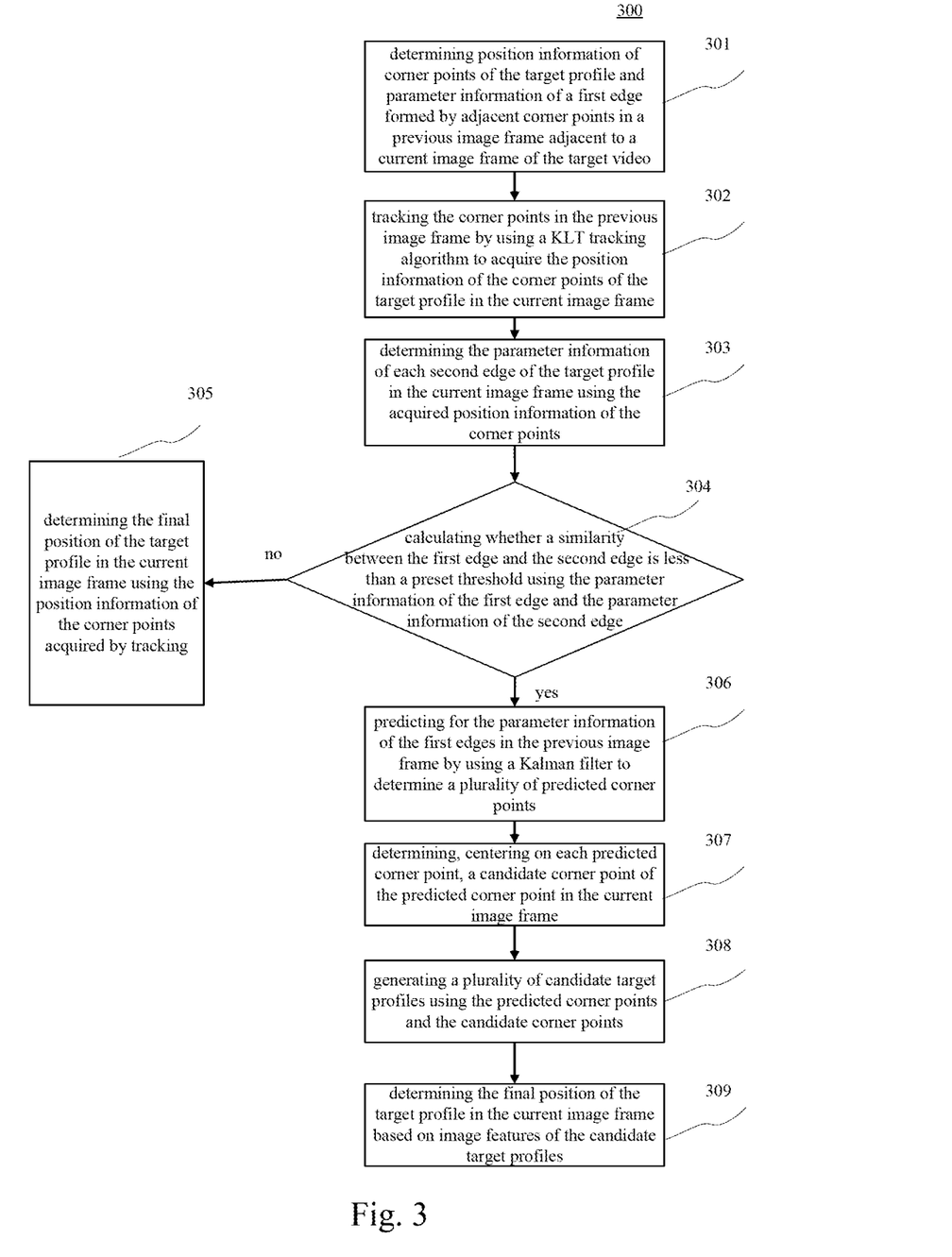
FIG. 3 is a flowchart of a method for tracking a target profile in a video according to another embodiment of the present disclosure.

With further reference to FIG. 3, a flow 300 of a method for tracking a target profile in a video according to another embodiment is illustrated. The flow 300 of the method for tracking a target profile in a video includes steps 301 to 309.

Step 301 includes determining position information of corner points of the target profile and parameter information of a first edge formed by adjacent corner points in a previous image frame adjacent to a current image frame of the target video.

In the present embodiment, the electronic device (e.g., the server as shown in FIG. 1) on which the method for tracking a target profile in a video is implemented may receive, through a wired connection or a wireless connection, the target video from the terminal used by the user for playing video, then extract multiple image frames from the acquired target video, determine a previous image frame adjacent to the current image frame from the image frames, and finally determine position information of corner points of the target profile and parameter information of the first edge formed by adjacent corner points in the previous image frame. Here, the first edge may be an edge of the target profile in the previous image frame. The target profile here may be a polygon formed by the outline of an object (such as a television or a photo frame) in the video image frame.

Step 302 includes tracking the corner points in the previous image frame by using a KLT tracking algorithm to acquire the position information of the corner points of the target profile in the current image frame.

In the present embodiment, based on the position information of the corner points of the target profile in the previous image frame determined in step 301, the electronic device (e.g., the server as shown in FIG. 1) may track the corner points determined in the previous image frame using the KLT tracking algorithm to determine position information of the corner points in the current image frame. Generally, since the motion of the target profile in the target video is continuous, the search range of the corner point tracking is generally not too large, for example, generally may be set as less than 10 pixels.

The KLT tracking algorithm is known as Kanade-Lucas-Tomasi Tracking, also known as the LK tracking algorithm. The premise of using the algorithm is that the target profile in the target video only has a small displacement and a small change of the gray scale. To track the target profile by using the KLT tracking algorithm, it is necessary to determine a target box enclosing the target profile in the previous image frame, and then obtain the offset of corner points having image features in the target box the same as those in a tracking box of the current image frame. It should be noted that the specific method of tracking the corner points by using the KLT is a well-known technique widely studied and applied at present, and detailed descriptions thereof will be omitted.

Step 303 includes determining the parameter information of each second edge of the target profile in the current image frame using the acquired position information of the corner points.

In the present embodiment, based on the corner points tracked in step 302, the electronic device may determine the edges of the target profile by using the tracked adjacent corner points. Here, the determined edges of the target profile may be the second edges. Further, the electronic device may calculate the parameter information of each second edge by using the position information of the tracked corner points.

Step 304 includes calculating whether a similarity between the first edge and the second edge is less than a preset threshold using the parameter information of the first edge and the parameter information of the second edge.

In the present embodiment, for any two adjacent corner points in the previous image frame, the two corner points may determine the first edge, and position information may be acquired by tracking the two corner points to determine a second edge corresponding to the first edge, and the second edge is the edge of the target profile in the current image frame. Using parameter information of the first edge and parameter information of the second edge corresponding to the first edge, the electronic device may calculate the similarity between the first edge and the second edge corresponding to the first edge. Then, the electronic device may determine whether the similarity is less than the preset threshold. If the similarity is determined to be less than the preset threshold, step 306 is proceeded. If the similarity is determined to be greater than or equal to the preset threshold, step 305 is proceeded.

Step 305 includes determining the final position of the target profile in the current image frame using the position information of the corner points acquired by tracking.

In the present embodiment, based on the determined similarity between the first edge and the second edge being greater than or equal to the preset threshold in step 304, the electronic device may determine that compared with the previous image frame, the target profile in the current image frame has a small motion displacement. The electronic device may acquire the position information of the corner points acquired by tracking using the KLT tracking algorithm, and determine the tracked corner points as the corner points of the target profile in the current image frame. Therefore, the final position of the target profile in the current image frame may be determined using the position information of the tracked corner points.

Step 306 includes predicting for the parameter information of the first edges in the previous image frame by using a Kalman filter to determine a plurality of predicted corner points.

In the present embodiment, based on the determined similarity between the first edge and the second edge being less than the preset threshold in step 304, the electronic device may determine that compared with the previous image frame, the target profile in the current image frame has a large motion displacement, and the tracking quality is poor. In this case, the electronic device needs to correct the result of poor tracking quality. Specifically, the electronic device may use the Kalman filter to predict for the determined parameter information of the first edges in the previous image frame to acquire the predicted parameter information. Then, using the predicted parameter information, multiple predicted edges may be determined. The points at intersections of the predicted edges may be used as the predicted corner points.

Step 307 includes determining, centering on each predicted corner point, a candidate corner point of the predicted corner point in the current image frame.

In the present embodiment, based on the predicted corner points determined in step 306, the electronic device may select, centering on the predicted corner points, a plurality of candidate corner points in the current image frame. For example, the electronic device may select candidate corner points within two pixels around each predicted corner point, so that a plurality of sets of candidate corner points of the target profile may be generated.

Step 308 includes generating a plurality of candidate target profiles using the predicted corner points and the candidate corner points.

In the present embodiment, based on the predicted corner points determined in step 306 and the candidate corner points determined in step 307, the electronic device may use the predicted corner points and the candidate corner points as corner points to form a plurality of profiles, and the profiles may be candidate target profiles of the target profile.

Step 309 includes determining the final position of the target profile in the current image frame based on image features of the candidate target profiles.

In the present embodiment, based on the plurality of candidate target profiles generated in step 308, the electronic device processes image features of the target profiles by various approaches, so that the final position of the target profile in the current image frame may be determined based on the image features of the candidate target profiles. Specifically, the electronic device may first set a reference image frame; then, calculate the similarity between the candidate target profiles and the target profile in the reference image frame using the image features of the candidate target profiles and the image feature of the target profile in the reference image frame; and finally, determine the candidate target profile having the greatest similarity with the target profile in the reference image frame from the candidate target profiles. The final position of the target profile in the current frame may be determined using the position information of the corner points of the determined candidate target profile, such as using the corner point position of the determined candidate target profile as the position of the corner point of the target profile in the current image frame.

As can be seen from FIG. 3, the flow 300 of the method for tracking a target profile in a video in the present embodiment highlights the step of generating a plurality of candidate target profiles using the predicted parameter information, as compared to the corresponding embodiment of FIG. 2. Therefore, the solution described in the present embodiment may generate a plurality of candidate target profiles by using the predicted first edge when the tracking quality of the target profile is determined to be poor, thereby ensuring that the final position of the target profile in the current image frame may still be accurately determined when the tracking quality of the target profile is poor.

Figure 4:
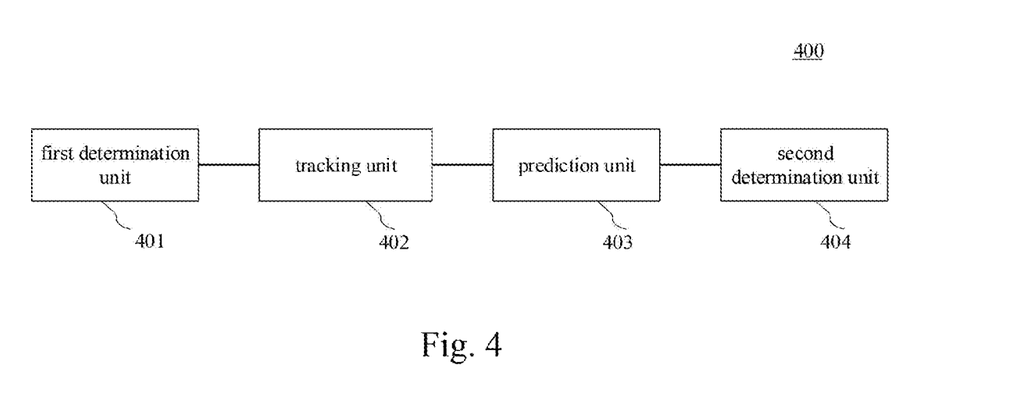
FIG. 4 is a schematic structural diagram of an apparatus for tracking a target profile in a video according to an embodiment of the present disclosure.

With further reference to FIG. 4, as an implementation to the method shown in the above profiles, the present disclosure provides an embodiment of an apparatus for tracking a target profile in a video. The apparatus embodiment corresponds to the method embodiment shown in FIG. 2, and the apparatus may specifically be applied to various electronic devices.

As shown in FIG. 4, the apparatus 400 for tracking a target profile in a video of the present embodiment includes: a first determination unit 401, a tracking unit 402, a prediction unit 403 and a second determination unit 404. The first determination unit 401 is configured to determine position information of corner points of the target profile and parameter information of a first edge formed by adjacent corner points in a previous image frame adjacent to a current image frame of the target video, the first edge being an edge of the target profile in the previous image frame. The tracking unit 402 is configured to track corner points of the target profile in the previous image frame to acquire position information of the corner points of the target profile in the current image frame to determine parameter information of a second edge, the second edge being an edge formed by adjacent corner points of the target profile in the current image frame. The prediction unit 403 is configured to predict for the parameter information of each first edge in the previous image frame to acquire predicted parameter information, and generate a plurality of candidate target profiles based on the predicted parameter information, in response to determining that a similarity between the first edge and a second edge corresponding to the first edge being less than a first preset threshold. The second determination unit 404 is configured to determine a final position of the target profile in the current image frame based on image features of the candidate target profiles.

In some alternative implementations of the present embodiment, the first determination unit 401 is further configured to: determine position information of the corner points of the target profile in the previous image frame of the target video; and determine the parameter information of each first edge of the target profile in the previous image frame based on the determined position information of the corner points.

In some alternative implementations of the present embodiment, the tracking unit 402 is further configured to: track the corner points in the previous image frame by using a KLT tracking algorithm to acquire the position information of the corner points of the target profile in the current image frame; and determine the parameter information of each second edge of the target profile in the current image frame using the acquired position information of the corner points.

In some alternative implementations of the present embodiment, the apparatus 400 further includes: a calcula-tion unit, configured to calculate a similarity between the first edge and the second edge by using the parameter information of the first edge and the parameter information of the second edge, for the first edge determined by any two adjacent corner points in the previous image frame and the second edge of the current image frame determined by position information acquired by tracking the two corner points; and a third determination unit, configured to determine, by using the position information of the corner points acquired by tracking, the final position of the target profile in the current image frame, in response to determining that the similarity between the first edge and the second edge being greater than or equal to the first preset threshold.

In some alternative implementations of the present embodiment, the prediction unit 403 is further configured to: predict for the parameter information of the first edges in the previous image frame by using a Kalman filter to acquire the predicted parameter information; determine predicted edges by using the predicted parameter information, and determining a plurality of predicted corner points based on the predicted edges; determine a candidate corner point of each predicted corner point in the current image frame centering on the predicted corner point; and generate a plurality of the candidate target profiles using the predicted corner points and the candidate corner points.

In some alternative implementations of the present embodiment, the second determination unit 404 is further configured to: divide the target video into consecutive N frames of images, where N is a positive integer; generate a reference image frame by using image frames preceding the previous image frame, and extract an image feature of the target profile from the reference image frame; calculate similarities between the image feature of the extracted target profile and the image features of the candidate target profiles; determine, from the plurality of candidate target profiles, a candidate target profile having the greatest similarity with the target profile in the reference image frame as the target profile in the current frame; and determine the final position of the target profile in the current frame using the determined position information of the corner points of the target profile in the current frame.

Figure 5:
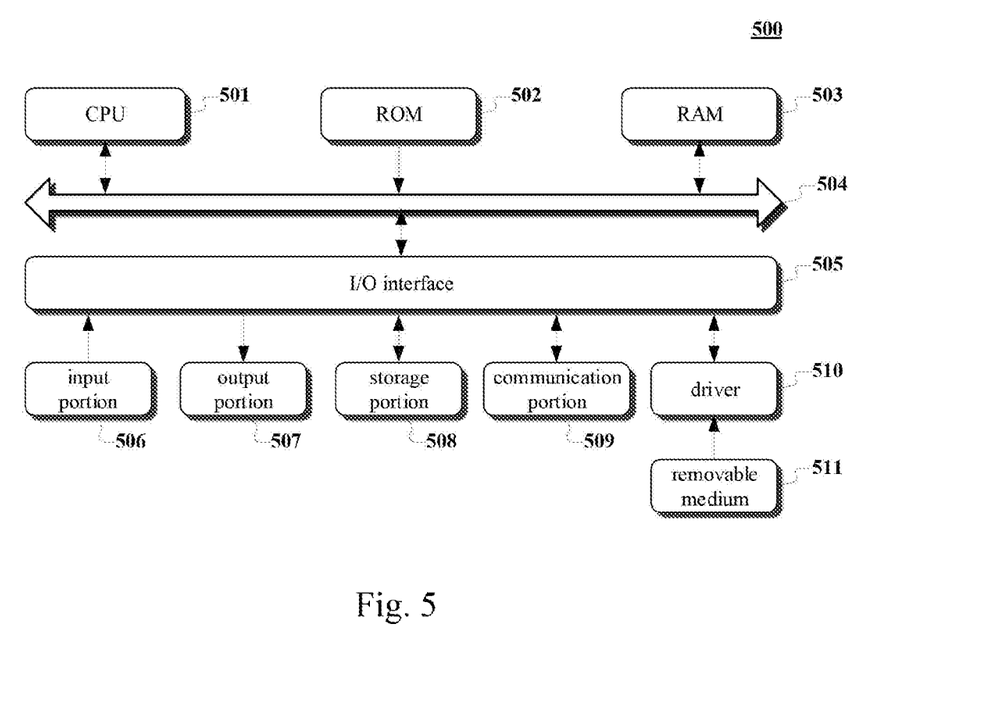
FIG. 5 is a schematic structural diagram of a computer system adapted to implement a terminal device or a server of the embodiments of the present disclosure.

Referring to FIG. 5, a schematic structural diagram of a computer system 500 adapted to implement a terminal device or a server of the embodiments of the present disclosure is shown. The terminal device or the server shown in FIG. 5 is only an example, and is not a limitation to the function and scope of the disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 including a cathode ray tube (CRT), a liquid crystal display device (LCD), a speaker etc.; a storage portion 508 including a hard disk and the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a first determination unit, a tracking unit, a predicting unit and a second determination unit, where the names of these units do not in some cases constitute a limitation to such units themselves. For example, the first determination unit may also be described as "a unit for determining position information of corner points of the target profile and parameter information of a first edge formed by adjacent corner points in a previous image frame adjacent to a current image frame of the target video, the first edge being an edge of the target profile in the previous image frame."

In another aspect, the present disclosure further provides a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: determine position information of corner points of the target profile and parameter information of a first edge formed by adjacent corner points in a previous image frame adjacent to a current image frame of the target video, the first edge being an edge of the target profile in the previous image frame; track the corner points of the target profile in the previous image frame to acquire position information of the corner points of the target profile in the current image frame to determine parameter information of a second edge, the second edge being an edge formed by adjacent corner points of the target profile in the current image frame; predict for parameter information of the first edge in the previous image frame to acquire predicted parameter information, and generating a plurality of candidate target profiles based on the predicted parameter information, in response to determining that a similarity between the first edge and a second edge corresponding to the first edge being less than a first preset threshold; and determine a final position of the target profile in the current image frame based on image features of the candidate target profiles.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for tracking a target profile in a video, comprising:
   determining position information of corner points of the target profile and parameter information of a first edge formed by adjacent corner points in a previous image frame adjacent to a current image frame of the target video, the first edge being an edge of the target profile in the previous image frame;
   tracking the corner points of the target profile in the previous image frame to acquire position information of the corner points of the target profile in the current image frame to determine parameter information of a second edge, the second edge being an edge formed by adjacent corner points of the target profile in the current image frame;
   predicting for parameter information of the first edge in the previous image frame to acquire predicted parameter information, and generating a plurality of candidate target profiles based on the predicted parameter information, in response to determining that a similarity between the first edge and a second edge corresponding to the first edge being less than a first preset threshold; and
   determining a final position of the target profile in the current image frame based on image features of the candidate target profiles.

2. The method according to claim 1, wherein the determining position information of corner points of the target profile and parameter information of a first edge formed by adjacent corner points in a previous image frame adjacent to a current image frame of the target video comprises:
   determining the position information of the corner points of the target profile in the previous image frame of the target video; and
   determining the parameter information of each first edge of the target profile in the previous image frame based on the determined position information of the corner points.

3. The method according to claim 1, wherein the tracking corner points of the target profile in the previous image frame to acquire position information of the corner points of the target profile in the current image frame to determine parameter information of a second edge comprises:
   tracking the corner points in the previous image frame by using a Kanade-Lucas-Tomasi, KLT, tracking algorithm to acquire the position information of the corner points of the target profile in the current image frame; and
   determining the parameter information of each second edge of the target profile in the current image frame using the acquired position information of the corner points.

4. The method according to claim 1, wherein after the tracking corner points of the target profile in the previous image frame to acquire position information of the corner points of the target profile in the current image frame to determine parameter information of a second edge, the method further comprises:
   calculating a similarity between the first edge and the second edge by using the parameter information of the first edge and the parameter information of the second edge, for the first edge determined by any two adjacent corner points in the previous image frame and the second edge of the current image frame determined by position information acquired by tracking the two adjacent corner points; and
   determining, by using the position information of the corner points acquired by tracking, the final position of the target profile in the current image frame, in response to determining that the similarity between the first edge and the second edge being greater than or equal to the first preset threshold.

5. The method according to claim 1, wherein the predicting for parameter information of the first edge in the previous image frame to acquire predicted parameter information, and generating a plurality of candidate target profiles based on the acquired predicted parameter information comprises:
   predicting for the parameter information of the first edge in the previous image frame by using a Kalman filter to acquire the predicted parameter information;
   determining predicted edges by using the predicted parameter information, and determining a plurality of predicted corner points based on the predicted edges;
   determining, centering on each predicted corner point, a candidate corner point of the each predicted corner point in the current image frame; and
   generating a plurality of candidate target profiles using the predicted corner points and the candidate corner points.

6. The method according to claim 1, wherein the determining a final position of the target profile in the current image frame based on image features of the candidate target profiles comprises:
   dividing the target video into consecutive N frames of images, wherein N is a positive integer;
   generating a reference image frame by using image frames preceding the previous image frame, and extracting an image feature of the target profile from the reference image frame;
   calculating similarities between the image feature of the extracted target profile and image features of the candidate target profiles;
   determining, from the candidate target profiles, a candidate target profile having the greatest similarity with the target profile in the reference image frame as the target profile in the current frame; and
   determining the final position of the target profile in the current frame using the determined position information of the corner points of the target profile in the current frame.

7. An apparatus for tracking a target profile in a video, comprising:
at least one processor; and
a memory storing instructions, the instructions when executed by the at least one processor, cause the at least one processor to perform operations, the operations comprising:
determining position information of corner points of the target profile and parameter information of a first edge formed by adjacent corner points in a previous image frame adjacent to a current image frame of the target video, the first edge being an edge of the target profile in the previous image frame;
tracking the corner points of the target profile in the previous image frame to acquire position information of the corner points of the target profile in the current image frame to determine parameter information of a second edge, the second edge being an edge formed by adjacent corner points of the target profile in the current image frame;
predicting for parameter information of the first edge in the previous image frame to acquire predicted parameter information, and generate a plurality of candidate target profiles based on the predicted parameter information, in response to determining that a similarity between the first edge and a second edge corresponding to the first edge being less than a first preset threshold; and
determining a final position of the target profile in the current image frame based on image features of the candidate target profiles.

8. The apparatus according to claim 7, wherein the determining position information of corner points of the target profile and parameter information of a first edge formed by adjacent corner points in a previous image frame adjacent to a current image frame of the target video comprises:
determining the position information of the corner points of the target profile in the previous image frame of the target video; and
determining the parameter information of each first edge of the target profile in the previous image frame based on the determined position information of the corner points.

9. The apparatus according to claim 7, wherein the tracking corner points of the target profile in the previous image frame to acquire position information of the corner points of the target profile in the current image frame to determine parameter information of a second edge comprises:
tracking the corner points in the previous image frame by using a Kanade-Lucas-Tomasi, KLT, tracking algorithm to acquire the position information of the corner points of the target profile in the current image frame; and
determining the parameter information of each second edge of the target profile in the current image frame using the acquired position information of the corner points.

10. The apparatus according to claim 7, after the tracking corner points of the target profile in the previous image frame to acquire position information of the corner points of the target profile in the current image frame to determine parameter information of a second edge, the operations further comprise:
calculating a similarity between the first edge and the second edge by using the parameter information of the first edge and the parameter information of the second edge, for the first edge determined by any two adjacent corner points in the previous image frame and the second edge of the current image frame determined by position information acquired by tracking the two adjacent corner points; and
determining, by using the position information of the corner points acquired by tracking, the final position of the target profile in the current image frame, in response to determining that the similarity between the first edge and the second edge being greater than or equal to the first preset threshold.

11. The apparatus according to claim 7, wherein the predicting for parameter information of the first edge in the previous image frame to acquire predicted parameter information, and generating a plurality of candidate target profiles based on the acquired predicted parameter information comprises:
predicting for the parameter information of the first edge in the previous image frame by using a Kalman filter to acquire the predicted parameter information;
determining predicted edges by using the predicted parameter information, and determining a plurality of predicted corner points based on the predicted edges;
determining, centering on each predicted corner point, a candidate corner point of the each predicted corner point in the current image frame; and
generating a plurality of candidate target profiles using the predicted corner points and the candidate corner points.

12. The apparatus according to claim 7, wherein the determining a final position of the target profile in the current image frame based on image features of the candidate target profiles comprises:
dividing the target video into consecutive N frames of images, wherein N is a positive integer;
generating a reference image frame by using image frames preceding the previous image frame, and extract an image feature of the target profile from the reference image frame;
calculating similarities between the image feature of the extracted target profile and image features of the candidate target profile;
determining, from the candidate target profiles, a candidate target profile having the greatest similarity with the target profile in the reference image frame as the target profile in the current frame; and
determining the final position of the target profile in the current frame using the determined position information of the corner points of the target profile in the current frame.

13. A non-transitory computer medium, storing a computer program, the computer program, when executed by a processor, causes the processor to perform operations, the operations comprising:
determining position information of corner points of the target profile and parameter information of a first edge formed by adjacent corner points in a previous image frame adjacent to a current image frame of the target video, the first edge being an edge of the target profile in the previous image frame;
tracking the corner points of the target profile in the previous image frame to acquire position information of the corner points of the target profile in the current image frame to determine parameter information of a second edge, the second edge being an edge formed by adjacent corner points of the target profile in the current image frame;

predicting for parameter information of the first edge in the previous image frame to acquire predicted parameter information, and generating a plurality of candidate target profiles based on the predicted parameter information, in response to determining that a similarity between the first edge and a second edge corresponding to the first edge being less than a first preset threshold; and determining a final position of the target profile in the current image frame based on image features of the candidate target profiles.

\* \* \* \* \*